United States Patent [19]

Mito et al.

[11] Patent Number: 5,275,848

[45] Date of Patent: Jan. 4, 1994

[54] PROCESS FOR PREPARING A LAMINATE OF METAL AND A POLYOLEFIN RESIN

[75] Inventors: Kazunori Mito; Tatsuo Saito; Naoshi Ishimaru, all of Waki, Japan

[73] Assignee: Mitsui Petrochemical Industries, Ltd., Tokyo, Japan

[21] Appl. No.: 769,818

[22] Filed: Oct. 2, 1991

[30] Foreign Application Priority Data

Oct. 2, 1990 [JP] Japan ................... 2-264813

[51] Int. Cl.$^5$ .............................. B05D 1/36
[52] U.S. Cl. .................. 427/409; 427/333; 427/377; 427/379
[58] Field of Search ............... 427/409, 185, 377, 379, 427/435, 333, 412.3

[56] References Cited

U.S. PATENT DOCUMENTS

| | | | |
|---|---|---|---|
| 3,002,854 | 10/1961 | Brill | 427/409 |
| 3,088,847 | 5/1963 | Pines | 427/409 |
| 3,941,909 | 3/1976 | Schoen et al. | 427/412.3 |
| 3,987,220 | 10/1976 | Bridgeford | 427/412.3 |
| 4,048,355 | 9/1977 | Sakayori et al. | 427/195 |
| 4,062,715 | 12/1977 | Manner et al. | 427/412.3 |
| 4,288,477 | 9/1981 | Bordini et al. | 427/412.3 |
| 4,345,004 | 8/1982 | Miyata et al. | 427/195 |
| 4,424,240 | 1/1984 | Keilbania, Jr. | 427/412.3 |
| 4,487,789 | 12/1984 | Iwanami et al. | 427/407.1 |
| 4,620,987 | 11/1986 | Yamashita et al. | 427/409 |
| 4,990,383 | 2/1991 | Bergström et al. | 428/35.9 |
| 5,110,392 | 5/1992 | Ito et al. | 427/412.3 |

FOREIGN PATENT DOCUMENTS

| | | | |
|---|---|---|---|
| 62-275747 | 11/1987 | Japan | 427/333 |
| 836793 | 6/1960 | United Kingdom | 427/333 |

Primary Examiner—Shrive Beck
Assistant Examiner—Diana Dudash
Attorney, Agent, or Firm—Sherman and Shalloway

[57] ABSTRACT

A process for preparing a laminate by coating the surfaces of a metal substrate that has been treated with an anchor coating agent, with a modified olefin type resin and heat-adhering the olefin resin onto the surfaces of the metal substrate. The process of this invention is characterized by applying heat-treatment to the laminate at the time of adhesion or after the adhesion in the presence of a treating agent which consists of a compound prescribed in the general formulae (1) and (2).

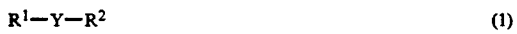

$$R^1-Y-R^2 \quad (1)$$

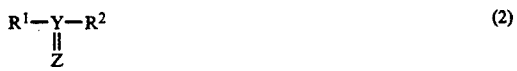

$$R^1-Y-R^2 \quad (2)$$
$$\phantom{R^1-}\overset{\|}{Z}$$

The laminate prepared by this process withstands deterioration of adhesion caused by aging, particularly in an atmosphere where water is present.

7 Claims, No Drawings

PROCESS FOR PREPARING A LAMINATE OF METAL AND A POLYOLEFIN RESIN

BACKGROUND OF THE INVENTION

1. Field of the Invention

The present invention relates to a process for preparing a laminate of a metal and a polyolefin resin. More specifically, the invention relates to a process for preparing a laminate which excellently withstands against the deterioration of adhesion caused by aging.

2. Description of the Related Art

The surfaces of metals have heretofore been coated with a resin to protect them from corrosion, fouling and damage. For instance, a transition joint that is used for the insert molding is subjected to severe environment in which it is brought into contact with molten resins. Therefore, its metallic threaded portions must be coated with a resin. A variety of resins for coating use are suitably selected depending upon the applications and the cost required.

The coating with resin is not limited to the above applications only but is widely employed in such fields as various parts and structural members made of metals, such as commodities, packaging materials, various panels, interior finish members, various casings, etc.

The polyolefin resin can be used for general purposes exhibiting such advantages as easy melt-adhesion upon heating, resistance against water, resistance against humidity, and excellent sanitary properties, and is further, available relatively cheaply. Because of its poor polarity, however, the polyolefin resin is adhered to metals only poorly and peels off easily from the metal after it is once adhered.

In order to improve this defect, an anchor coating agent of organotitanium or the like is applied in advance to the surface of the metal which is to be coated with the polyolefin resin, and then the polyolefin type resin is heat-adhered via the anchor coating agent, as is widely known.

Moreover, it has heretofore been known to improve the adhesiveness by introducing a polar group into the polyolefin resin, and to graft-modify the polyolefin resin with an unsaturated carboxylic acid or an anhydride thereof such as a maleic anhydride in order to apply and heat-adhere it onto the surface of the metal substrate. For instance, according to Japanese Patent Publication No. 10184/1981, a polyolefin grafted with an unsaturated carboxylic acid or an anhydride thereof is heat-adhered to a metal fitting via an organosilicon compound that has a hydroxyl group or a hydrolyzable group and an acid-reactive group and that is disposed on an interface between the two. Moreover, Japanese Patent Publication No. 12299/1983 discloses a composition consisting of 70 to 95 parts by weight of an acid-modified polyethylene and 5 to 30 parts by weight of a polypropylene, which is laminated on a metal, and Japanese Patent Publication No. 40491/1983 discloses a composition consisting of 99 to 70 parts by weight of an acid-modified polyolefin and 1 to 30 parts by weight of a hydrocarbon-type elastomer, that is used as an adhesive agent for laminating a polyolefin on a metal foil.

In fact, however, though the laminate of a polyolefin type resin and a metal substrate exhibits a high adhesion strength during the initial period, the adhesion strength decreases with the lapse of time almost without exception. This tendency appears conspicuously in an environment where water is present. For instance, the aforementioned acid-modified polyolefin resin exhibits a considerably great initial adhesion strength for metals but loses adhesive force drastically with the lapse of time in an environment where water exists. The tendency of adhesion deterioration is also recognized even when the surface of the metal is treated with an anchor coating agent such as organotitanate prior to effecting the adhesion.

In preparing a laminate by coating a metal substrate with a polyolefin resin and heat-adhering it thereon, therefore, it is an object of the present invention to provide a treatment method which prevents the adhesion strength between the metal substrate and the polyolefin resin from decreasing with the lapse of time and, particularly, which prevents the adhesion strength from decreasing in an environment where water exists.

Another object of the present invention is to provide a method of effecting the treatment for preventing the adhesion strength from decreasing with the lapse of time in a simple and easy manner at a relatively low cost.

SUMMARY OF THE INVENTION

According to the present invention, there is provided a process for preparing a laminate by coating the surface of a metal substrate that has been treated with an anchor coating agent with a modified olefin resin and heat-adhering the modified olefin type resin onto the surfaces of the metal substrate, wherein a process for preparing a laminate of a metal and a polyolefin resin comprises heat-treating the laminate at the time of adhesion or after the adhesion in the presence of a treating agent which consists of at least one of a compound of the formula:

$$R^1-Y-R^2 \qquad (1)$$

wherein $R^1$ is a substituted or unsubstituted monovalent hydrocarbon group, Y is an oxygen atom, a sulfur atom or a group $-NR^2-$, and $R^2$ is a hydrogen atom or a substituted or unsubstituted monovalent hydrocarbon group, or of the formula:

$$R^3-\underset{\underset{Z}{\|}}{C}-R^4 \qquad (2)$$

wherein $R^3$ is a substituted or unsubstituted monovalent hydrocarbon group, and Z is an oxygen atom, a sulfur atom, or a group represented by the formula:

$$=N-R^9 \qquad (3)$$

(wherein $R^9$ is a hydrogen atom or a substituted or unsubstituted monovalent hydrocarbon group), and $R^4$ is a hydrogen atom, an amino group, a substituted or unsubstituted monovalent hydrocarbon group, or a group represented by the formula:

$$-OR^5 \qquad (4)$$

(wherein $R^5$ is a hydrogen atom or a substituted or unsubstituted monovalent hydrocarbon group), or a group represented by the formula:

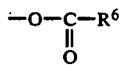

(wherein $R^6$ is a substituted or unsubstituted monovalent hydrocarbon group), and wherein when the group Z is a sulfur atom, $R^4$ is a substituted or unsubstituted hydrocarbon group and when the group Z is the group of formula 3, $R^4$ is a hydrogen atom or a substituted or unsubstituted monovalent hydrocarbon group and when $R^4$ is the group of formula 5 and Z is the oxygen atom, the group $R^3$ and the group $R^6$ coupled together may form a substituted or unsubstituted divalent hydrocarbon group,
or an organosilicon compound.

According to the present invention, the heat treatment is carried out in the presence of a treating agent which consists of at least one of a compound of formula 1 or formula 2 or an organosilicon compound. The heat treatment may be carried out simultaneously with the heat-adhesion of the polyolefin type resin to the metal or in a separate step after the heat-adhesion is finished.

In the former embodiment, for example, the surface of the metal substrate that has been treated with the anchor coating agent are coated with a modified olefin type resin that contains an oxygen-containing organic compound or an organosilicon compound, and the coating of the olefin type resin is adhered under the heated condition. In the latter embodiment, for example, the surfaces of the metal substrate that has been treated with the anchor coating agent are coated with the modified olefin type resin which is then heat-adhered to the surfaces of the metal substrate, and the obtained laminate is heat-treated in an atmosphere that contains an oxygen-containing organic compound or an organosilicon compound.

Operation

The laminate obtained by adhering the metal and the polyolefin resin together can be evaluated for its tendency of adhesion deterioration with the lapse of time in compliance with a promotion testing in which the laminate is immersed in the hot water heated at 90° C. for one week.

The laminate obtained by coating the metal substrate, that has been treated with the anchor coating agent to reinforce the adhesive force, with an acid-modified polyolefin type resin that exhibits particularly excellent adhesive force, may exhibit the initial adhesive strength of a fully satisfactory level. When subjected to the test for promoting the adhesion deterioration with aging, however, the polyolefin type resin is often peeled off already or exhibits a residual adhesive force which is decreased down to the level of several percent of the initial value.

On the other hand, when the laminate of the surface-treated metal and the olefin resin is heat-treated at the time of adhesion or after the adhesion in the presence of a treating agent of at least one of the aforementioned compound of formula 1 or formula 2 or the organosilicon compound in compliance with the present invention, a high adhesive force is maintained even when the laminate is subjected to the above-mentioned test for promoting the adhesion deterioration with aging. Moreover, peeling is suppressed at the adhesion interface and the adhesive force is maintained which is as great as the cohesive breakdown force of the olefin resin as manifested by the compression-shear peeling test and the 180° C. peeling test.

In the heat treatment for increasing the adhesive force of the present invention, it is essential that the aforementioned treating agent exists in the treating atmosphere but it should be noted that the treating agent needs exist in a trace amount or in a very small amount. This is because the deterioration of adhesion of the laminate with the lapse of time with which the invention is concerned takes place on the adhesion interface between the surface-treated metal substrate and the polyolefin type resin layer, and the action for preventing the adhesion from decreasing with the lapse of time stems from the action of the trace amount of the treating agent that migrates to the adhesion interface passing through the polyolefin type resin layer.

In the present invention, it is important that the aforementioned treating agent is permitted to act at the time of heat treatment. The action for preventing the deterioration of adhesion with the lapse of time of the treating agent used in the present invention was discovered as a phenomenon as a result of extensive experiments, but its mechanism has not been clarified yet. It is, however, believed that the heat-treatment of the laminate during or after the adhesion permits the treating agent to be easily transmitted and diffused onto the adhesion interface passing through the polyolefin resin, and promotes the reaction or the mutual action between the adhesion interface and the treating agent.

According to the method of the present invention, the laminate is simply heat-treated in the presence of the treating agent during or after the adhesion. Therefore, the operation is simple and easy. Moreover, the treating agent is easily available at a relatively low cost and is used in small amounts, presenting such an advantage that the cost of treatment is low.

DETAILED DESCRIPTION OF THE PREFERRED EMBODIMENT

Metal Substrate

The method of the present invention can be adapted to any metal such as iron, steel, copper, aluminum, zinc, nickel, tin, stainless steel, brass and the like. The metal substrate may be made of a so-called alloy, or may be a composite metal substrate such as a plated plate or a clad plate. The metal substrate may have any form such as a metal foil or plate, rod, tube, channel member, H-member, ring or various metal parts. Examples of the metal foil and plate include those made of a so-called pure aluminum or aluminum alloy, black plate, steel plate or foil (TFS) electrolytically treated with chromate, zinc-plate steel plate, tin-plated steel plate or foil, nickel-plated steel plate, tin-nickel-plated steel plate, chrome-plated steel plate, aluminum-plated steel plate, and the like. In order to improve, the corrosion resistance and to increase the adhesive force, these metal substrates may have been subjected to the surface treatment which is known per se such as treatment with phosphoric acid, treatment with chromic acid, or treatment with phosphoric acid/chromic acid.

In the process of the present invention, it is recommended to carry out the pre-treatment of dewaxing and washing according to a customary manner to cleanse the surface of the metal to which the resin will be adhered. The method of dewaxing and washing may be a method which effects the wiping to a sufficient degree using a clean absorbent cotton or cloth impregnated with a degreasing agent or a dewaxing solvent or a method such as ultrasonic washing in these solvents or dewaxing with an alkali, that is usually carried out for the treatment of this kind, and there is no particular limitation.

Next, the surfaces of the metal are treated with the anchor coating agent.

The anchor coating agent which is used may be an organotitanate compound, an organozirconate compound or a like compound. Concrete examples of the organotitanate compound include alkoxides and oligomers thereof such as tetraisopropyl titanate, tetra-n-butyl titanate, tetra(2-ethylhexyl) titanate and the like; complex compounds and oligomers thereof such as titanium acetyl acetonate, tetratitanium acetyl acetonate and the like; acylates and oligomers thereof such as titanium lactate and the like. Concrete examples of the organozirconate compound include alkoxides and oligomers thereof such as tetraisopropyl zirconate, tetra-n-butyl zirconate, tetra(2-ethylhexyl) zirconate and the like; complex compounds and oligomers thereof such as zirconium acetyl acetonate, tetrazirconium acetyl acetonate and the like; acylates and oligomers thereof such as zirconium lactate and the like; and acetylacetonezirconium butylate and the like. They may be used in a single kind or in a combination of two of more kinds.

To treat the surfaces of the metal with the anchor coating agent, for example, a solution obtained by dissolving the anchor coating agent in a suitable solvent is applied to the surfaces of the metal followed by drying. The solution is applied by any one of immersion, spray coating or application using a brush.

Examples of the solvent used for dissolving the anchor coating agent include aliphatic hydrocarbons such as pentane, hexane and the like; aromatic hydrocarbons such as toluene, xylene and the like; alcohols such as ethanol, propanol and the like; and halogenated hydrocarbons such as trichloroethylene and the like, which may be used in a single kind or in a combination of two or more kinds.

The concentration of the anchor coating agent in the solution is usually adjusted to be about 0.1 to 100% by weight, preferably about 1 to 20% by weight, and more preferably about 1 to 10% by weight though it may vary depending on the method of application.

The anchor coating agent is applied in a generally employed amount which preferably ranges from 900 to 2800 mg/m$^2$ based on the oxide. The metal substrate coated with the solution of anchor coating agent is dried to form a film which generally is composed of an oxide. In general, the drying should be carried out at a temperature of from 50° to 250° C. for about 1 to 30 minutes.

Polyolefin Resin

Examples of a base polymer of the modified polyolefin resin to which the process of the present invention can be applied include a homopolymer of α-olefin, a copolymer of two or more kinds of α-olefin, or a copolymer of α-olefin and other compounds which are compolymerizable with the α-olefin. Examples of the α-olefin include ethylene, propylene, 1-butene, 1-hexene, 4-methyl-1-pentene, 1-octene, 1-decene, 1-dodecene, 1-tetradecene, 1-hexadecene, 1-octadecene, 1-eicosene and the like having 2 to 20 carbon atoms. Examples of the above other compounds include those compounds having a polyunsaturated bond such as a conjugated diene or a nonconjugated diene. In the present invention, one or two or more kinds of these compounds may be contained in the polyolefin type resin. When the polyolefin type resin contains these other compounds, their amount is usually from about 1 to 99 mol%.

Preferred examples of the base polyolefin type resin include a low-, medium- or high-density polyethylene, a linear low-density polyethylene (low- to medium-density polyethylene from low to medium pressure polymerization process), a polypropylene, an ethylene-propylene copolymer, a propylene-butene-1 copolymer, an ethylene-butene-1 copolymer, an ionically crosslinked olefin copolymer (ionomer), and blends thereof. Further, the base polyolefin resin should be suitably modifying. Examples of the modified monomer contained in the modified polyolefin type resin include unsaturated carboxylic acids such as acrylic acid, maleic acid, fumaric acid, tetrahydrophthalic acid, itaconic acid, citraconic acid, crotonic acid, isocrotonic acid, Nadic acid® (endo-cis-bicyclo[2,2,1]hepto-5-en-2,3-dicarboxylic acid) and the like; or derivatives thereof such as acid halide, acid amide, acid imide, acid anhydride, ester and the like. Concrete examples include maleyl chloride, maleimide, maleic anhydride, citraconic anhydride, dimethyl maleate, glycidyl maleate, methyl aceylate, methyl methacrylate, ethyl acrylate, ethyl methacrylate, butyl acrylate, butyl methaceylate, glycidyl acrylate, glycidyl methacrylate, monoethyl ester maleate, diethyl ester maleate, monomethyl ester fumarate, dimethyl ester fumarate, monobutyl ester itaconate, dibutyl ester itaconate, amide acrylate, amide methacrylate, monoamide maleate, diamide maleate, N-monoethylamide maleate, N,N-dimethylamide maleate, N-monobutylamide maleate, N,N-dibutylamide maleate, monoamide fumarate, diamide fumarate, N,N-diethylamide fumarate, N-monobutylamide fumarate N,N-dibutylamide fumarate and the like, which may be contained in a single kind or in two or more kinds. The above modified monomers are usually contained in an amount of about 0.0001 to 3% by weight in the modified polyolefin type resin.

Among the above modified polyolefin resins, the acid-modified polyolefin resin is preferred and, particularly, the polyolefin resin graft-modified with a maleic anhydride is preferred, such as a polyethylene, a polypropylene or an ethylene-propylene copolymer. It is also allowable to use the unmodified polyolefin type resin and the acid-modified polyolefin type resin in combination.

The modified polyolefin type resin that is used should have a molecular weight which is at least large enough to form a film as a matter of course, and its melt flow rate should lie within a range of from 0.01 to 50 g/10 min, and particularly from 0.1 to 50 g/10 min.

Treating Agent

In formula 1 mentioned earlier, $R^1$ is a substituted or unsubstituted monovalent hydrocarbon group and $R^2$ is a hydrogen atom or a substituted or unsubstituted monovalent hydrocarbon group. Here, examples of the monovalent hydrocarbon group represented by $R^1$ or $R^2$ include alkyl groups such as methyl group, ethyl group, propyl group, isopropyl group, butyl group, sec-butyl group, tert-butyl group, pentyl group, hexyl group, octyl group, dodecyl group, 2-ethylhexyl group and the like; unsaturated hydrocarbon groups such as allyl group, 1-propenyl group, isopropenyl group, vinyl group and the like; aromatic hydrocarbon groups such as phenyl group, naphthyl group, tolyl group, xylyl group, ethylphenyl group, mesityl group and the like; and alicyclic hydrocarbon groups such as cyclopentyl group, cyclohexyl group and the like. It is desired that the number of carbon atoms of the hydrocarbon group lies over a range of from 1 to 15, and particularly from 2 to 10. These hydrocarbon groups may be substituted by at least one halogen atom such as a chlorine atom or a fluorine atom, hydroxyl group, alkoxyl group, thiol group, thioalkoxy group or amino group. In formula 2 described earlier, $R^3$ is a hydrogen atom or a substituted or unsubstituted monovalent hydrocarbon group, and examples of the hydrocarbon group denoted by $R^3$ may be those which were exemplified above in connection with $R^1$ and $R^2$ This also holds true for the groups $R^4$, $R^5$, $R^6$ and $R^9$ when they are monovalent hydrocarbon groups.

Concrete examples of the organic compound represented by the general formula formula 1 or formula 2 include alcohols, phenols, ketones, aldehydes, carboxylic acids, organic acid esters, ethers, acid amides, acid anhydrides, thiols, thioethers, thiocarbonyls, amines and oximes. More concretely, the examples include alcohols such as methanol, ethanol, propanol, isopropanol, butanol, sec-butyl alcohol, pentanol, hexanol, octanol, 2-ethylhexanol, dodecanol, monoethylene glycol, diethylene glycol, glycerin and the like; phenols such as phenol, cresol, xylenol, ethylphenol and the like; ketones such as acetone, methyl ethyl ketone, methylisobutyl ketone, acetophenone, benzophenone and the like; aldehydes such as acetaldehyde, propionaldehyde, octylaldehyde and the like; organic acid esters such as methyl formate, methyl acetate, vinyl acetate, propyl acetate, ethyl propionate, methyl methacrylate, ethyl crotonate, dibutyl maleate, methyl benzoate, ethyl benzoate, propyl benzoate, butyl benzoate, octyl benzoate, cyclohexyl benzoate, phenyl benzoate, dimethyl phthalate, dibutyl phthalate and the like; ethers such as methyl ether, ethyl ether, butyl ether, amyl ether, anisole and the like; acid amides such as amide acetate, amide toluylate and the like; acid anhydrides such as benzoic anhydride, phthalic anhydride and the like; thiols such as ethyl mercaptan, propyl mercaptan and the like; thioethers such as ethyl thioether, butyl thioether, phenyl thioether and the like; thiocarbonyls such as thiobenzophenone, di-t-butyl thioketone and the like; amines such as monoethanolamine, diethanolamine, triethanolamine, triethylamine, diethylaniline and the like; and oximes such as acetoxime, 2-butanone oxime, and the like.

Furthermore, the organosilicon compound may be the one that is represented by formula 6:

$$R^7{}_n Si(OR^8)_{4-n}$$

wherein a plurality of $R^7$ and $R^8$ may be the same different ent ones and represent monovalent substituted or unsubstituted hydrocarbon groups, and n is an integer of 0 to 3.

The monovalent hydrocarbon groups represented by $R^7$ and $R^8$ may, for example, be those exemplified above in connection with $R^1$ or $R^2$ of formula 1.

Concrete examples of the organosilicon compound include ethyl silicate, butyl silicate, vinyl trimethoxysilane, dimethyl dimethoxysilane, diethyl dimethoxysilane, dipropyl dimethaxysilane, phenyl trimethoxysilane, t-butylmethyl dimethoxysilane, cyclohexylmethyl dimethoxysilane, diphenyl dimethoxylsilane, dicyclopentyl dimethoxysilane and the like.

In the present invention, the oxygen-containing compounds and the organosilicon compounds represented by formula 1 or formula 2 are used in a single kind or in a combination of two or more kinds.

Among these compounds, the process of the present invention preferably employs alcohols phenols, organic esters or organosilicon compounds, and particularly preferably employs aliphatic alcohols such as isopropyl alcohol, ethylene glycol and the like or organosilicon compounds such as alkoxysilane and the like.

Coating, Heat-Adhesion and Heat Treatment

The polyolefin resin can be applied to the surface-treated metal by any means which is widely known per se by using a film or a sheet of the polyolefin resin or a molten material thereof. The coating and heat-adhesion may be effected simultaneously through one step or through two or more steps. The polyolefin resin in the form of a powder can be applied by the fluidized bed immersion method, electrostatic powder coating method or any other powder coating method. In this case, if the metal substrate is heated at a temperature higher than the melting point of the polyolefin resin, it is allowed to effect the heat adhesion simultaneously with the coating. For instance, the fluidized bed immersion method is a coating method that can be preferably employed in the present invention and a in which the metal substrate heated at a temperature higher than the melting point of the resin is immersed in the fluidized bed of the polyolefin resin powder in order to form a coated layer of the polyolefin resin on the surfaces thereof. The thickness of the coated layer can be adjusted by adjusting the time of immersion in the fluidized bed or by adjusting the particle size of the powder or the concentration of resin in the fluidized bed.

When the metal substrate consists of a foil or a sheet, the polyolefin resin is applied in the form of a film or a sheet to the surface of the metal substrate followed by heating to effect the heat-adhesion thereby to obtain the laminate. The laminate can be heated by the high-frequency induction heating, electric resistance heating by feeding a current, infrared-ray heating, heating by the heating roller, oven heating or the like method.

Furthermore, the polyolefin resin in the molten form can be applied to the surfaces of the metal substrate by the extrusion molding, press molding, of injection molding and, then, the two are heat-adhered together to obtain the laminate. When the extrusion molding is employed, for example, the polyolefin resin is extruded into the form of a film or a sheet so that it can be applied to the metal surface. When press molding is employed, the polyolefin type resin in molten form is applied to the metal substrate and is molded into any desired shape by using the press metal mold. When the injection molding is employed, the metal substrate is inserted in the metal mold cavity, and the polyolefin resin is injected to obtain a desired laminate.

According to the present invention, the coating and heat-adhesion are carried out by using any means that works to reinfence the adhesion between the modified polyolefin resin and the metal substrate. For example, the surfaces of the modified polyolefin film are subjected to corona discharge treatment, ozone treatment or flame treatment in order to increase the adhesive force. When the extrusion coating method is employed, furthermore, the extruded product of modified polyolefin is caused to pass through a predetermined air gap to oxidize the surface thereof and to increase the adhesive force.

A method can further be effectively employed by utilizing a laminate of the acid-modified polyolefin resin and the unmodified resin. For example, a laminate film or sheet consisting of the acid-modified polyolefin resin and the unmodified polyolefin is laminated maintaining such a positional relationship that the acid-modified polyolefin is opposed to the surfaces of the metal substrate. The above laminar structure can be applied to the multi-layer extrusion or the multi-layer injection, too. Moreover, the surfaces of the metal substrate may be thinly precoated with the acid-modified polyolefin by the fluidized bed immersion method or the like method and are then coated with the unmodified polyolefin by extrusion coating or injection molding, in order to obtain a laminate.

The treating agent of the present invention is contained in advance in the polyolefin type resin that is to be applied, in order to carry out the treatment of the present invention simultaneously with the coating and the heat-adhesion. This method sufficiently prevents the adhesive force from decreasing with the lapse of time even though the treating agent is used in very small amounts; i.e., the treating agent should be contained in an amount of 1 to 10000 ppm, preferably in an amount of 10 to 1000 ppm, and most preferably in an amount of 50 to 200 ppm on the basis of weight.

When the laminate after the adhesion has been finished is to be heat-treated in the presence of the treating agent, the treating agent is applied to the laminate by the immersion coating method, roller coating method or spray coating method, or the vapor of the treating agent is made present in the atmosphere of heat treatment. The treating agent is used in an amount over the range described above and, preferably, in an amount of from 50 to 200 ppm.

The heating temperature should, in general, range from 150° to 300° C., and the heating time should preferably range from 10 to 120 minutes. The heating may be effected in the air or in an a inert atmosphere such as in an nitrogen gas. From the standpoint of preventing the oxidation of the resin, however, it is preferred to carry out the heating in an inert atmosphere.

EFFECT OF THE INVENTION

According to the present invention, the laminate consisting of an anchor-coated metal substrate and a polyolefin resin, that is being prepared, is heat treated in the presence of a particular treating agent at the time of adhesion or after the adhesion, in order to effectively prevent the adhesive force from being decreased by aging particularly in an atmosphere where water is present, Furthermore, the treatment according to the present invention is carried out simply and easily presenting advantage in the cost of treatment.

EXAMPLES

The invention will be further described by way of the following examples.

(Example 1)

A bronze ring (12 mm in inner diameter, 20 mm in outer diameter, 20 mm in length) was washed by ultrasonic waves in toluene at room temperature for one hour to dewax and cleanse the surface thereof.

The ring was immersed in a toluene solution containing 5% of a titanium isopropylate (isopropyl titanate (IV)) and was then dried. Then, by masking the two end surfaces and the outer surface, the ring was heated at 220° C., and its inner surface was coated with the powder of a modified polymer obtained by graft-modifying a low-density polyethylene from low pressure polymerization process (density 0.930 g/cm$^3$) with 0.1% by weight of a maleic anhydride by the fluidized bed immersion method maintaining a thickness of about 0.3 mm, and the ring was cooled. Then, the ring was immersed in an isobutyl alcohol for 5 minutes and was then introduced into an oven where it was heat-treated at 220° C. for 40 minutes under nitrogen atmosphere. The ring was then immersed in the hot water heated at 90° C. for one week, and was subjected to the compression-shear peeling test. The compression-shear peeling test was carried out by inserting a metal pole having an outer diameter of 12 mm at a temperature of 23° C. at a test speed of 10 mm/min. The compression shear load was 1600 Kg.

(Example 2)

The procedure was carried out in the same manner as in Example 1 with the exception of using an ethylene glycol instead of the isobutyl alcohol.

The compression-shear peeling test indicated the compression shear load to be 1600 Kg.

(Example 3)

The procedure was carried out in the same manner as in Example 1 with the exception of using a brass ring instead of the metal ring. The compression-shear peeling test indicated the compression shear load to be 1600 Kg.

(Example 4)

A brass plate was washed by ultrasonic waves in toluene at room temperature for one hours to dewax and cleanse the surfaces thereof.

The plate was immersed in a toluene solution containing 5% of a titanium isopropylate (isopropyl titanate (IV)) and was then dried. Then, the plate was heated at 220° C. and was coated with the powder of a modified polymer obtained by graft-modifying a low-density polyethylene from low pressure polymerization process (density 0.930 g/cm$^3$) with 0.1% by weight of a maleic anhydride by the fluidized bed immersion method maintaining a thickness of about 1.5 mm, and was then cooled. Then, the plate was immersed in an isobutyl alcohol for 5 minutes and was then introduced into an oven where it was heat-treated at 220° C. for 40 minutes under nitrogen atmosphere. The plate was immersed in the hot water heated at 90° C. for one week, and was subjected to the 180° C. peeling test. The 180° C. peeling test was carried out a temperature of 23° C. maintaining a width of 10 mm and a test speed of 10 mm/min. The peeling strength was greater than 3.5 Kg/cm, and the resin was not peeled off but was broken.

(Example 5)

The procedure was carried out in the same manner as in Example 4 with the exception of using a stainless steel SUS304 plate instead of the metal plate. The peeling test indicated the peeling strength to be greater than 3.1 Kg/cm, and the resin was not peeled off but was broken.

(Example 6)

A brass plate was washed by ultrasonic waves in toluene at room temperature for one hour to dewax and cleanse the surfaces thereof.

The plate was immersed in a toluene solution containing 5% of a titanium isopropylate (isopropyl titanate (IV)) and was then dried. Then, the plate was heated at 220° C. and was coated with the powder of a modified polymer obtained by graft-modifying a low-density polyethylene from low pressure polymerization process (density 0.930 g/cm$^3$) with 0.1% by weight of a maleic anhydride and mixed with 200 wppm of an isobutyl alcohol by the fluidized bed immersion method maintaining a thickness of about 1.5 mm, and was cooled. The plate was then immersed in the hot water heated at 90° C. for one week, and was subjected to the 180° peeling test. The 180° peeling test was carried out at a temperature of 23° C. maintaining a width of 10 mm and a test speed of 10 mm/min. The peeling strength was greater than 3.5 Kg/cm, and the resin was not peeled off but was broken.

(Comparative Example 1)

The procedure carried out in the same manner as in Example 1 but without immersing the ring in the isobutyl alcohol. The compression-shear peeling test indicated the compression shear peel load to be 80 Kg.

(Comparative Example 2)

The procedure was carried out in the same manner as in Example 4 but without immersing the plate in the isobutyl alcohol. The resin had been peeled off already while the plate was being immersed in the water of 90° C. for one week.

(Example 7)

A laminate was prepared and tested in the same manner as in Example 4 with the exception of using an ethylene glycol as a treating agent instead of the isobutyl alcohol. The peeling strength was greater than 3.5 Kg/cm, and the resin was cohesively broken down.

(Example 8)

A laminate was prepared and tested in the same manner as in Example 4 with the exception of using an aluminum plate instead of the brass plate and using ethylene glycol as the treating agent. The peeling strength was greater than 3.5 Kg/cm, and the resin was cohesively broken down.

(Example 9)

A laminate was prepared and tested in the same manner as in Example 4 with the exception of using a stainless steel (SUS304) plate instead of the brass plate and using ethylene glycol as the treating agent. The peeling strength was 3.5 Kg/cm, and the resin was cohesively broken down.

(Example 10)

A laminate was prepared and tested in the same manner as in Example 4 with the exception of using a steel plate (black plate) instead of the brass plate and using ethylene glycol as the treating agent. The peeling strength was greater than 3.5 Kg/cm, and the resin was cohesively broken down.

(Example 11)

A laminate was prepared and tested in the same manner as in Example 4 with the exception of using a methylisobutyl ketone as the treating agent instead of the isobutyl alcohol. The peeling strength was greater than 3.5 Kg/cm, and the resin was cohesively broken down.

(Example 12)

A laminate was prepared and tested in the same manner as in Example 4 with the exception of using a vinyl trimethoxysilane as the treating agent instead of the isobutyl alcohol. The peeling strength was greater than 3.5 Kg/cm, and the resin was cohesively broken down.

(Example 13)

A laminate was prepared and tested in the same manner as in Example 4 with the exception of using a 2-butanone oxime as the treating agent instead of the isobutyl alcohol. The peeling strength was greater than 3.5 Kg/cm, and the resin was cohesively broken down.

(Example 14)

A laminate was prepared and tested in the same manner as in Example 4 with the exception of using the ethyl acetate as the treating agent instead of the isobutyl alcohol. The peeling strength was greater than 3.5 Kg/cm, and the resin was cohesively broken down.

What is claimed is:

1. In a process for preparing a laminate of a metal substrate and a modified polyolefin, wherein said modified polyolefin comprises a homopolymer of an olefin or a copolymer of olefins grafted with an unsaturated carboxylic acid or an anhydride thereof in an amount of 0.001 to 3% by weight, based on the weight of the polyolefin, the improvement comprising the steps of:

coating the modified polyolefin onto a surface of the metal substrate that has been coated with an anchor coating agent; and heating-adhering the modified polyolefin onto said surface of the metal substrate at a temperature higher than the melting point of the modified polyolefin to obtain a laminate;

wherein the obtained laminate is heat-treated at a temperature of from 150° to 300° C. in contact with a treating agent which is at least one compound selected from the group consisting of a compound of the formula (1):

$$R^1-Y-R^2 \tag{1}$$

wherein $R^1$ is a substituted or unsubstituted monovalent hydrocarbon group, Y is an oxygen atom, a sulfur atom or a group $>NR^2$, and $R^2$ is a hydrogen atom or a substituted or unsubstituted monovalent hydrocarbon group, and a compound of the formula (2):

$$R^3-\underset{\underset{Z}{\|}}{C}-R^4 \tag{2}$$

wherein $R^3$ is a substituted or unsubstituted monovalent hydrocarbon group, and Z is an oxygen atom, a sulfur atom, or a group represented by the formula (3):

$$=N-R^9 \tag{3}$$

wherein $R^9$ is a hydrogen atom or a substituted or unsubstituted monovalent hydrocarbon group, and $R^4$ is a hydrogen atom, an amino group, a substituted or unsubstituted monovalent hydrocarbon group, or a group represented by the formula (4):

$$-OR^5 \tag{4}$$

wherein $R^5$ is a hydrogen atom or a substituted or unsubstituted monovalent hydrocarbon group, or a group represented by the formula (5):

$$-O-\underset{\underset{}{\overset{O}{\|}}}{C}-R^6 \tag{5}$$

wherein $R^6$ is a hydrogen atom or a substituted or unsubstituted monovalent hydrocarbon group, and wherein the group Z is a sulfur atom, $R^4$ is a substituted or unsubstituted monovalent hydrocarbon group, and when the group Z is the group of the formula (3), $R^4$ is a hydrogen atom or a substituted or unsubstituted monovalent hydrocarbon group, and when $R^4$ is the group of the formula (5) and Z is the oxygen atom, the group $R^3$ and the group $R^6$ coupled together may form a substituted or unsubstituted divalent hydrocarbon group; or said heat-adhesion is carried out using the modified polyolefin containing the treating agent.

2. A process according to claim 1, wherein the treating agent is contained in the modified polyolefin in an amount of 1 to 10,000 ppm.

3. A process according to claim 1, wherein the compound used as the treating agent is an oxygen-containing organic compound.

4. A process according to claim 3, wherein said oxygen-containing organic compound is an alcohol having a valence of 1 to 3.

5. A process according to claim 4, wherein said alcohol is an ethylene glycol.

6. A process according to claim 1, wherein a base polymer of said modified polyolefin is a homopolymer or a copolymer of $\alpha$-olefin.

7. A process according to claim 3, wherein said heat-treatment of the obtained laminate is carried out in an atmosphere that contains the oxygen-containing organic compound.

* * * * *